United States Patent
Hou et al.

(10) Patent No.: US 10,545,465 B2
(45) Date of Patent: Jan. 28, 2020

(54) SYSTEM AND METHOD FOR SELECTING CONTROLLABLE PARAMETERS FOR EQUIPMENT OPERATION SAFETY

(71) Applicant: Accenture Global Services Limited, Dublin (IE)

(72) Inventors: Fang Hou, Beijing (CN); Yan Gao, Harbin (CN)

(73) Assignee: Accenture Global Services Limited, Dublin (IE)

(*) Notice: Subject to any disclaimer, the term of this patent is extended or adjusted under 35 U.S.C. 154(b) by 101 days.

(21) Appl. No.: 15/765,666

(22) PCT Filed: Oct. 15, 2015

(86) PCT No.: PCT/CN2015/092044
§ 371 (c)(1),
(2) Date: Apr. 3, 2018

(87) PCT Pub. No.: WO2017/063178
PCT Pub. Date: Apr. 20, 2017

(65) Prior Publication Data
US 2019/0079472 A1    Mar. 14, 2019

(51) Int. Cl.
G05B 13/04    (2006.01)
G05B 9/02    (2006.01)
(Continued)

(52) U.S. Cl.
CPC .......... *G05B 13/048* (2013.01); *G05B 9/02* (2013.01); *G06F 3/0482* (2013.01);
(Continued)

(58) Field of Classification Search
None
See application file for complete search history.

(56) References Cited

U.S. PATENT DOCUMENTS

| 7,660,642 B1* | 2/2010 | Tuszynski | G05B 19/41875 |
| | | | 700/97 |
| 2006/0058899 A1* | 3/2006 | Boyden | B01D 53/30 |
| | | | 700/44 |

(Continued)

FOREIGN PATENT DOCUMENTS

| CN | 103605287 A | 2/2014 |
| CN | 103615716 A | 3/2014 |
| CN | 103729569 A | 4/2014 |

OTHER PUBLICATIONS

International Bureau of WIPO, International Preliminary Report on Patentability in Application No. PCT/CN2015/092044, dated Apr. 26, 2018, pp. 1-5.

(Continued)

*Primary Examiner* — Ryan A Jarrett
(74) *Attorney, Agent, or Firm* — Brinks Gilson & Lione

(57) ABSTRACT

A system and a method for selecting controllable parameters for equipment operation safety are provided. The system includes a memory, a display, a communication interface, and circuitry in communication with the memory, the communication interface and the display, the circuitry is configured to: identify a key safety monitoring index (KSMI) for the equipment operation safety, select a first subset of the controllable parameters according to a first regression, select a second subset of the controllable parameters from the first subset of the controllable parameters to predict the KSMI, predict the equipment operation safety for a future time, determine a safety range, and transmit the controllable parameters to be set for the equipment operation safety according to the determined safety range.

21 Claims, 11 Drawing Sheets

(51) Int. Cl.
*G06F 3/0482* (2013.01)
*G06F 3/0484* (2013.01)
*G06F 17/15* (2006.01)
*G06F 17/18* (2006.01)

(52) U.S. Cl.
CPC .......... *G06F 3/04847* (2013.01); *G06F 17/15* (2013.01); *G06F 17/18* (2013.01)

(56) References Cited

U.S. PATENT DOCUMENTS

2009/0125155 A1    5/2009  Hill et al.
2011/0112998 A1*   5/2011  Abe ..................... G06N 5/003
                                                 706/13
2017/0314961 A1*  11/2017  Chen ..................... G06F 17/18

OTHER PUBLICATIONS

International Search Report and Written Opinion of the International Search Authority dated Jul. 15, 2016 in International Application No. PCT/CN2015/092044 (English language) (7 pp.).

\* cited by examiner

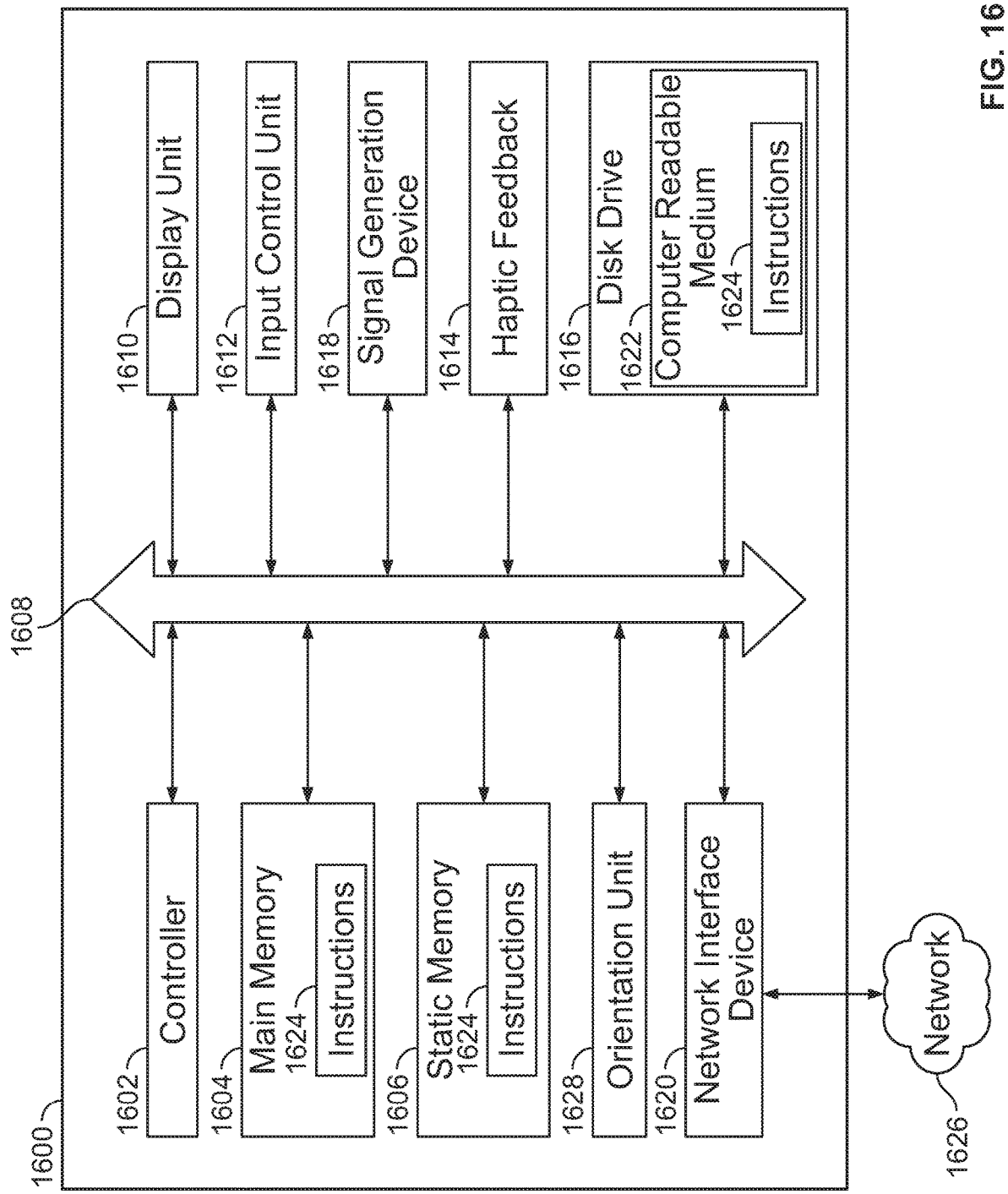

SYSTEM AND METHOD FOR SELECTING CONTROLLABLE PARAMETERS FOR EQUIPMENT OPERATION SAFETY

CROSS-REFERENCE TO RELATED APPLICATION

The application is a national phase application of and claims priority to the international PCT application No. PCT/CN2015/092044, filed on Oct. 15, 2015 with the State Intellectual Property Office of China, the entirety of which is incorporated herein by reference.

FIELD OF THE TECHNOLOGY

The disclosure relates to the field of equipment operation safety, and more particularly, it relates to a system and a method for selecting controllable parameters for equipment operation safety.

BACKGROUND OF THE TECHNOLOGY

Equipment safety is important for plants to operate. The equipment failures during production could be very costly. The manufacturer safety parameters settings are primarily for the new equipment and may not be suitable for the equipment when the equipment begin to age. However, the traditional methods are primarily focusing on the failure prediction. The traditional methods do not support parameter adjustments to help reducing the equipment failure when the equipment is under various risky conditions. As such, there are technical problems to be resolved in order to select controllable parameters for equipment operation safety for adjusting the parameter settings in order to safely operate the plant equipment.

SUMMARY

Examples of the present disclosure provide at least a system and a method for selecting controllable parameters for equipment operation safety.

In one embodiment, the present disclosure provides a system for selecting controllable parameters for equipment operation safety that may include a memory, a display, a communication interface, and circuitry in communication with the memory, the communication interface and the display. The circuitry may be configured to: identify a key safety monitoring index (KSMI) for the equipment operation safety and collect historical records of the controllable parameters of equipment that may be associated with the KSMI, and select a first subset of the controllable parameters that may have correlations to the KSMI above a user selectable threshold according to a first regression.

The circuitry may further be configured to select a second subset of the controllable parameters from the first subset of the controllable parameters to predict the KSMI by using a second regression, where the second subset may have a number of the controllable parameters that may be less than a number of controllable parameters in the first subset while maintaining a predetermined level of accuracy to predict the KSMI, and a residual error of the second regression may be determined and a trend of the residual error may be predicted by using a frequency based division.

The circuitry may predict the equipment operation safety for a future time for a combination of values of the second subset of the controllable parameters, determine a safety range for each of the second subset of the controllable parameters wherein the equipment operation safety is achieved when the controllable parameters are inside the safety range, and transmit the controllable parameters to be set for the equipment operation safety according to the determined safety range.

In another embodiment, the present disclosure provides a method that may include identifying a key safety monitoring index (KSMI) for the equipment operation safety and collecting historical records of the controllable parameters of equipment that may be associated with the KSMI, and selecting a first subset of the controllable parameters that may have correlations to the KSMI above a user selectable threshold according to a first regression.

The method may also include selecting a second subset of the controllable parameters from the first subset of the controllable parameters to predict the KSMI by using a second regression, where the second subset may have a number of the controllable parameters that may be less than a number of controllable parameters in the first subset while maintaining a predetermined level of accuracy to predict the KSMI, and a residual error of the second regression may be determined and a trend of the residual error may be predicted by using a frequency based division.

The method may include predicting the equipment operation safety for a future time for a combination of values of the second subset of the controllable parameters, determining a safety range for each of the second subset of the controllable parameters where the equipment operation safety may be achieved when the controllable parameters are inside the safety range, and transmitting the controllable parameters to be set for the equipment operation safety according to the determined safety range.

In an additional example of the method, the present disclosure provides a method that may include identifying a key safety monitoring index (KSMI) for the equipment operation safety and collecting historical records of the controllable parameters of equipment that may be associated with the KSMI where the KSMI may reflect the equipment operation safety and may be provided by a manufacturer, and selecting a first subset of the controllable parameters that may have correlations to the KSMI above a user selectable threshold according to a first regression, where the first subset of the controllable parameters may be selected based on importance of each controllable parameter to the KSMI, and the user selectable threshold may measure the importance.

The method may include selecting a second subset of the controllable parameters from the first subset of the controllable parameters to predict the KSMI by using a second regression, where the second subset may have a number of the controllable parameters that may be less than a number of controllable parameters in the first subset while maintaining a predetermined level of accuracy to predict the KSMI, and a residual error of the second regression may be determined by subtracting an expected value of the predicted KSMI from an actual KSMI derived from the collected historical records, and a trend of the residual error may be predicted by decomposing original series into multiple levels according to the frequency based division and using a signal reconstruction to rebuild every frequency components into a time domain as series components, and predicting each of the series components and summing results as a prediction of the original series.

The method may include predicting the equipment operation safety for a future time for a combination of values of the second subset of the controllable parameters, determining a safety range for each of the second subset of the controllable parameters where the equipment operation safety may be achieved when the controllable parameters are inside the safety range, and where the equipment operation safety for the future time may be reflected by a safety probability that may be calculated for each combination of the second subset of the controllable parameters, and the safety range may be determined by selecting the combinations of the second subset of the controllable parameters when the safety probability meets a predetermined requirement, and transmitting the controllable parameters to be set for the equipment operation safety, and adjusting the controllable parameters for the KSMI to achieve the equipment operation safety according to the determined safety range.

BRIEF DESCRIPTION OF THE DRAWINGS

The system and/or method may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 16 illustrates an example of a computer system that may be used for selecting controllable parameters for equipment operation safety.

DETAILED DESCRIPTION OF ILLUSTRATED EXAMPLES

It is important for plants to keep equipment safety and avoid failures during production. As such, the effective decision support to improve real-time or short-term equipment safety may be necessary. However, the default equipment safety settings from the manufacturer may not be suitable. The default safety settings from manufacturer may be mainly for the new equipment under rated production condition and may not be suitable for the equipment when it becomes aging or is under non-rated condition.

Traditional analysis methods may not be effective. For example, the traditional parse methods may require deep expertise and its modeling requirement may be a big hurdle for implementation. Also, the traditional data-driven methods may rely on large sample records. In addition, the traditional methods may be primarily focusing on the failure prediction, and the traditional methods may not provide decision-support on how to adjust proper parameter to help reducing the equipment failure or probability of equipment failure when the equipment is under high failure risky condition. The traditional methods may only concern about the parameter of the equipment itself. The traditional methods may not include the parameters of other equipment and process which may affect the equipment short-term safety and reliability.

The present disclosure discloses a new system and method that may effectively provide the proper parameter setting range of the equipment itself & related equipment/process, and thus help to decrease the short term failure risk of the equipment with less modeling complexity and acceptable calculation accuracy. The equipment parameters may be set and adjusted according to the recommended parameter setting range of the equipment.

Figure 1:
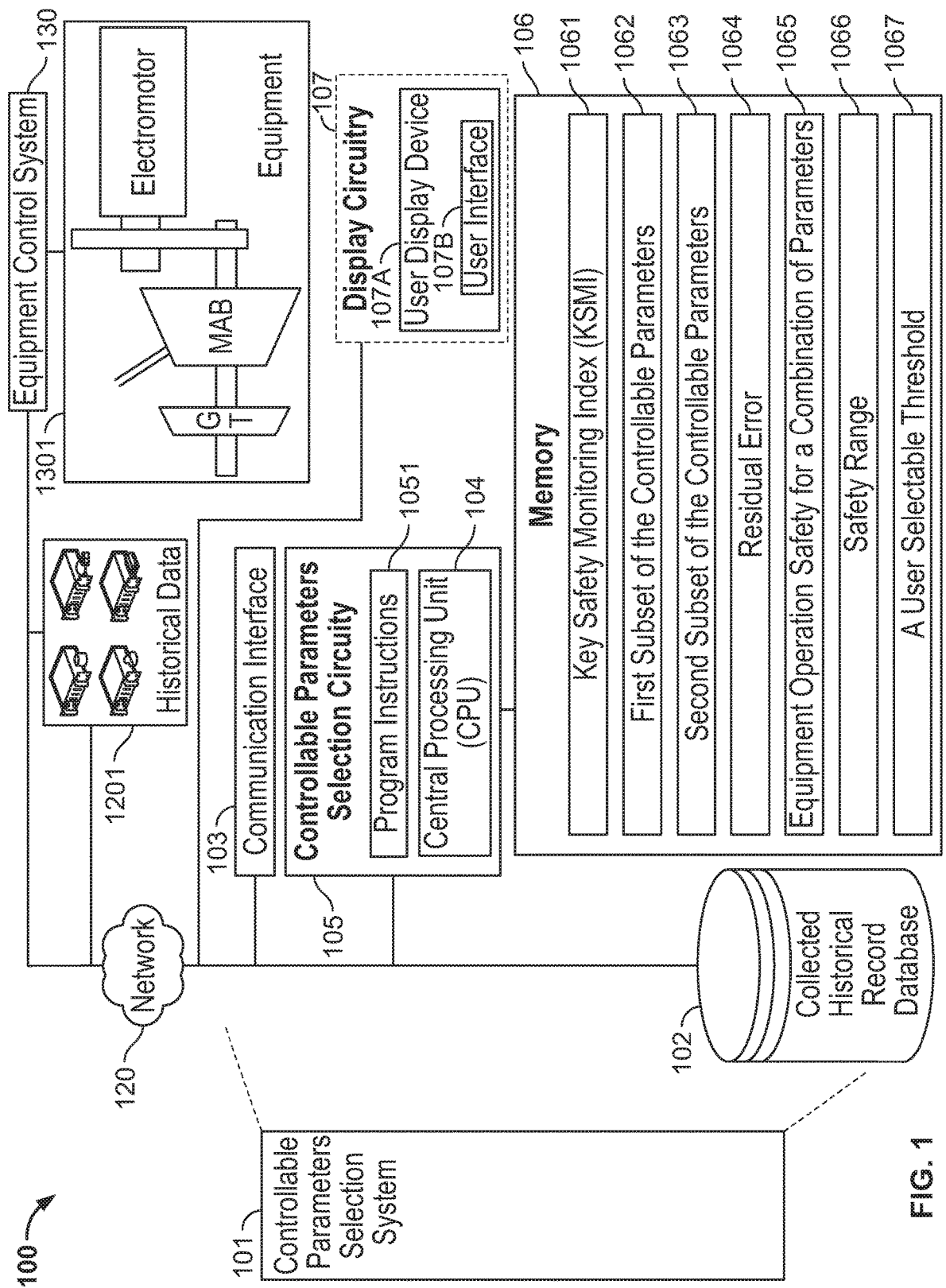
FIG. 1 shows an example system diagram that depicts the controllable parameter selection system for equipment operation safety.

FIG. 1 shows an example system diagram that depicts the controllable parameter selection system for equipment operation safety 100. As shown in FIG. 1, a controllable parameters selection system 101 may include a memory 106, a display circuitry 107 that may include a user display device 107A having a user interface 107B, a communication interface 103 and controllable parameters selection circuitry 105.

According to FIG. 1, The controllable parameters selection circuitry 105 may include program instructions 1051 and one or more central processing unit (CPU) 104 and may be in communication with the memory 106, the communication interface 103, the display circuitry 107, collected historical record database 102 that may store the data which may be read through network 120 from historical data stored remotely. The controllable parameters selection circuitry 105 may also communicate with equipment control system 130 that may control the setting of parameters for equipment 1301.

The memory 106 may stores data that may include the key safety monitoring index (KSMI) 1061, first subset of the controllable parameters 1062, second subset of the controllable parameters 1063, residual error 1064, equipment operation safety for a combination of parameters 1065, one or more safety ranges 1066 for controllable parameters, and a user selectable threshold 1067. The controllable parameters selection circuitry 105 may be configured by executing program instructions 1051 to cause the CPU 104 to identify a key safety monitoring index (KSMI) 1061 for the equipment operation safety and collect historical records of the controllable parameters of equipment that may be associated with the KSMI 1061. The controllable parameters selection circuitry 105 may collect the historical records through network 120 from historical data 1021 stored remotely and may store the collected historical records in the collected historical record database 102.

The controllable parameters selection circuitry 105 may further cause the CPU 104 to select a first subset of the controllable parameters 1062 that may have correlations to the KSMI 1061 when the correlations have values that may be above a user selectable threshold 1067 according to a first regression. The user selectable threshold 1067 may be obtained from the user interface 107B. The user selectable threshold 1067 may also be one or more predetermined values. The controllable parameters selection circuitry 105 may also cause the CPU 104 to select a second subset of the controllable parameters 1063 from the first subset of the controllable parameters 1062 to predict the KSMI 1061 by using a second regression, where the second subset may have a number of the controllable parameters that may be less than a number of controllable parameters in the first subset while maintaining a predetermined level of accuracy to predict the KSMI, and a residual error 1064 of the second regression is determined and a trend of the residual error is predicted by using a frequency based division.

In general, the KSMI may be more accurately predicted when more controllable parameters are used. However, in order to keep the KSMI prediction simple and keep the safety operation applicable by avoiding too many parameters to control, the less controllable parameters may be selected from the first subset of controllable parameters to form the second subset of controllable parameters. Even so, the certain accuracy level for the KSMI prediction may still be required when less number of controllable parameters is used. As such, a user selectable threshold or a predetermined level of accuracy may be set for selecting the second subset of controllable parameters to make sure the certain accuracy level is achieved when the less number of controllable parameters is used.

The controllable parameters selection circuitry 105 may cause the CPU 104 to predict the equipment operation safety for a future time for a combination of values of the second subset of the controllable parameters 1065, determine a safety range 1066 for each of the second subset of the controllable parameters where the equipment operation safety may be achieved when the controllable parameters are inside the safety range. The controllable parameters selection circuitry 105 may cause the CPU 104 to transmit the controllable parameters to be set for the equipment operation safety according to the determined safety range 1066.

The KSMI 1061 shown in FIG. 1 may be used to reflect the equipment operation safety and may be provided by a manufacturer. The first subset of the controllable parameters 1062 may be selected based on importance of each parameter to the KSMI 1061, and the user selectable threshold 1067 may measure the importance. The first regression may comprise a random forest algorithm.

The residual error 1064 shown in FIG. 1 may be determined by subtracting an expected value of the predicted KSMI from an actual KSMI derived from the collected historical records that may be stored in the collected historical record database 102. The trend of the residual error 1064 may be predicted by decomposing original series into multiple levels according to the frequency based division and using a signal reconstruction to rebuild every frequency components into a time domain as series components, and predicting each of the series components and summing results as a prediction of the original series.

The equipment operation safety for the future time may be reflected by a safety probability that may be calculated for each combination of the second subset of the controllable parameters. The safety range 1066 may be determined by selecting the combinations of the second subset of the controllable parameters 1065 when the safety probability meets a predetermined requirement. The predetermined requirement may be a predetermined probability, 95% for example.

The controllable parameters selection circuitry 105 in FIG. 1 may further cause the CPU 104 to predict a plurality of sets of the controllable parameters for the KSMI, and evaluate each set of the controllable parameters by determining the predicted safety range for each set of the controllable parameters for the KSMI. The controllable parameters selection circuitry 105 in FIG. 1 may further cause the CPU 104 to adjust the controllable parameters for the KSMI to achieve the equipment operation safety according to the determined safety range.

Figure 2:
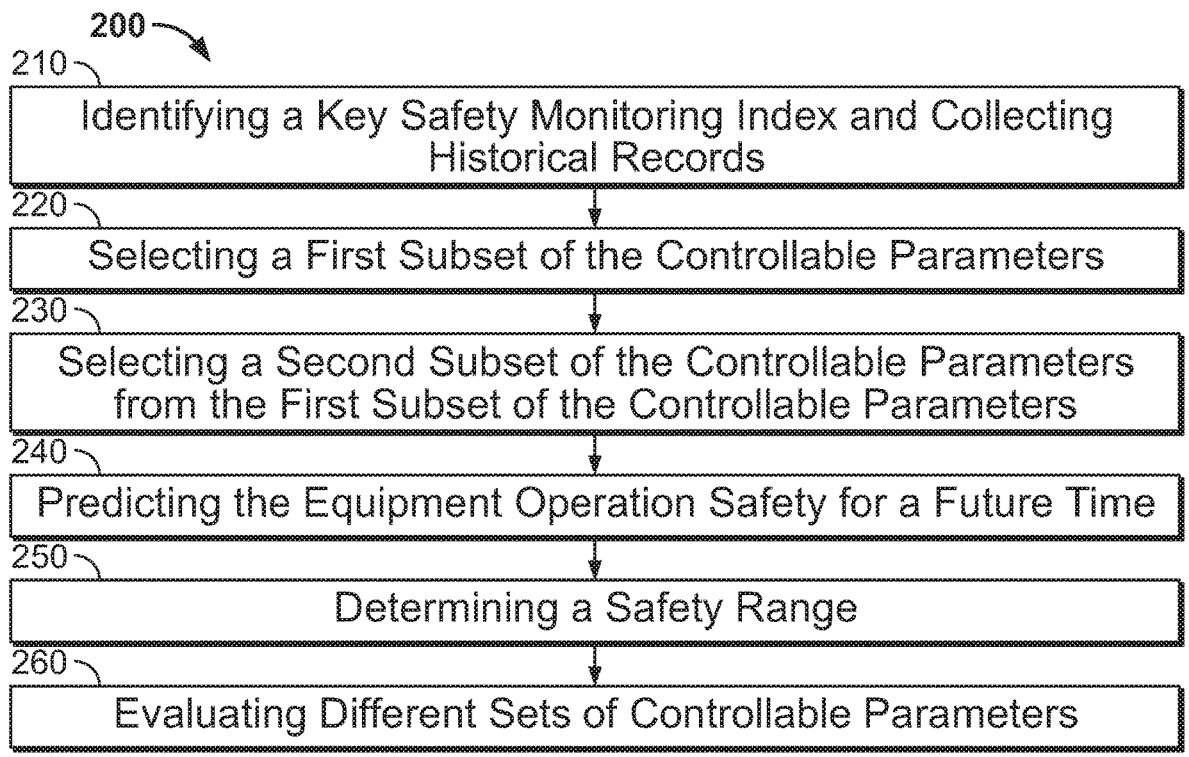
FIG. 2 illustrates an example of logic for selecting controllable parameters for equipment operation safety.

FIG. 2 illustrates an example of logic for selecting controllable parameters for equipment operation safety 200. The logic 200 may include identifying a key safety monitoring index (KSMI) for the equipment operation safety and collecting historical records of the controllable parameters of equipment that may be associated with the KSMI 210, selecting a first subset of the controllable parameters that may have correlations to the KSMI above a user selectable threshold according to a first regression 220.

The logic 200 may include selecting a second subset of the controllable parameters from the first subset of the controllable parameters to predict the KSMI by using a second regression, where the second subset may have a number of the controllable parameters that may be less than a number of controllable parameters in the first subset while maintaining a predetermined level of accuracy to predict the KSMI, and a residual error of the second regression may be determined and a trend of the residual error may be predicted by using a frequency based division 230.

The logic 200 may include predicting the equipment operation safety for a future time for a combination of values of the second subset of the controllable parameters 240, and determining a safety range for each of the second subset of the controllable parameters where the equipment operation safety may be achieved when the controllable parameters are inside the safety range 250. The logic 200 may also include transmitting the controllable parameters to be set for the equipment operation safety according to the determined safety range. Logic 200 may include predicting a plurality of sets of the controllable parameters for the KSMI, and evaluating each set of the controllable parameters by determining the predicted safety range for each set of the controllable parameters for KSMI 260. The logic 200 may include adjusting the controllable parameters for the KSMI to achieve the equipment operation safety according to the determined safety range.

The KSMI identified in logic 200 may be used to reflect the equipment operation safety and may be provided by a manufacturer. The first subset of the controllable parameters that may be selected by logic 200 may be based on importance of each parameter to the KSMI, and the user selectable threshold used in logic 200 may measure the importance.

The first regression conducted in logic 200 may comprise a random forest algorithm. The residual error that may be determined in logic 200 may be determined by subtracting an expected value of the predicted KSMI from an actual KSMI derived from the collected historical records. A trend of the residual error may be predicted by decomposing original series into multiple levels according to the frequency based division and using a signal reconstruction to rebuild every frequency components into a time domain as series components, and predicting each of the series components and summing results as a prediction of the original series.

The equipment operation safety for the future time may be reflected by a safety probability that may be calculated for each combination of the second subset of the controllable parameters that may be selected in logic 200. The safety range that may be determined in logic 200 may be determined by selecting the combinations of the second subset of the controllable parameters when the safety probability meets a predetermined requirement which may be a predetermined probability, 95% for example.

The logic 200 may further include adjusting the controllable parameters for the KSMI to achieve the equipment operation safety according to the determined safety range.

Figure 3:
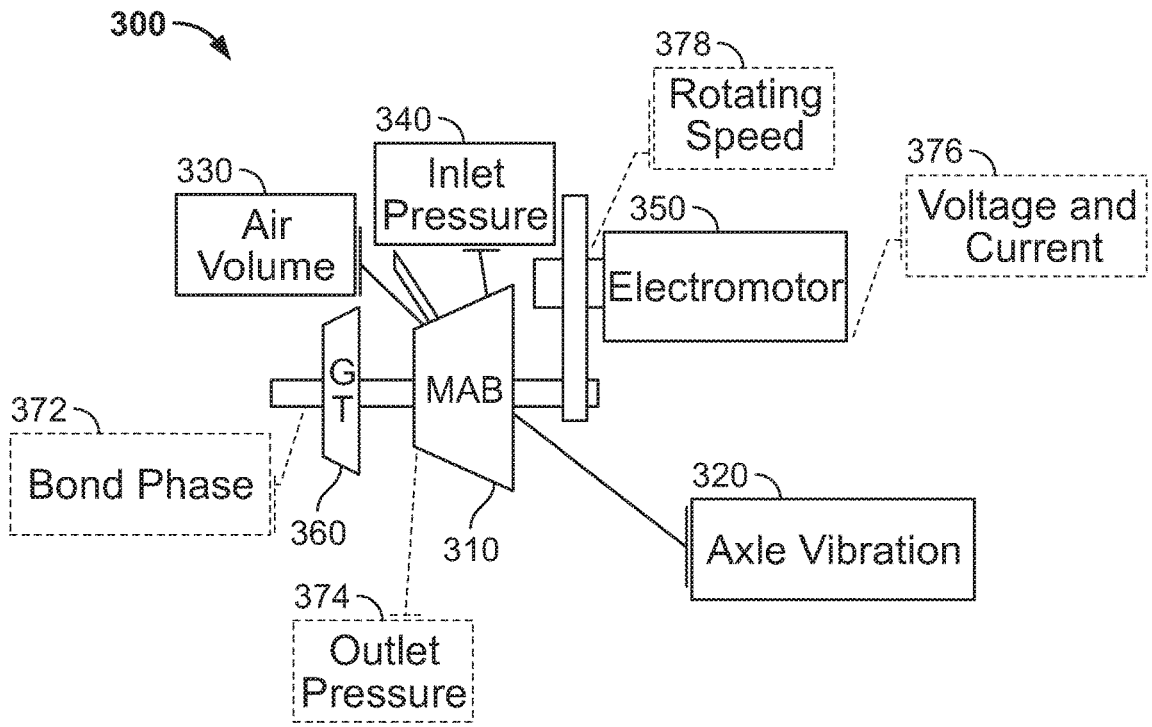
FIG. 3 illustrates an example of equipment operation and a key safety monitoring index (KSMI) and controllable parameters.

FIG. 3 illustrates an example of equipment operation and a key safety monitoring index (KSMI) and controllable parameters 300. The AV45 shafting subsystem of the reaction-reproduction system in oil refining may be used as an example in FIG. 3. As shown in FIG. 3, the shafting subsystem contains main air blower (MAB) 310 and electromotor 350 and gas turbine (GT) 360. The safety operation of main air blower 310 may be affected by various factors. The factors that may affect the safety operation of MAB 310 in FIG. 3 may include axle vibration 320, air volume, inlet pressure 340, bond phase 372, outlet pressure 374, rotating speed 378 and voltage and current 376.

Figure 4:
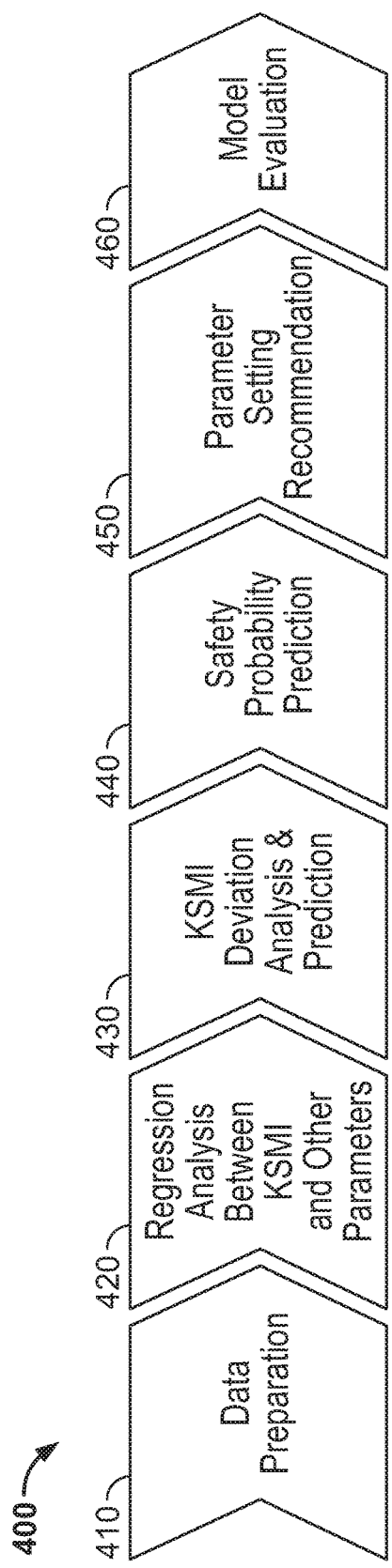
FIG. 4 illustrates a solution framework for selecting controllable parameters for equipment operation safety.

FIG. 4 illustrates a solution framework for selecting controllable parameters for equipment operation safety 400. FIG. 4 shows various steps for predicting the equipment failure possibility under different controllable parameter settings and then, based on that to recommend suitable parameter setting range, ensuring better short-term operation safety of equipment. As shown in FIG. 4, the solution framework may include data preparation 410, regression analysis between KSMI and other parameters 420, KSMI deviation analysis & prediction 430, safety probability prediction 440, parameter setting recommendation 450 and model evaluation 460.

In data preparation 410, a Key Safety Monitoring Index (KSMI) may be chosen and short term historical records (e.g. several days) that may be associated with the KSMI may be collected. Equipment's safety status may be reflected by some key safety monitoring indexes, such as axle vibration, temperature, etc. Equipment may be at risk when an index value exceeds a warning value. During data preparation 410, the short term historical records of the operation controllable parameters of the equipment and related other equipment and process data may also be collected. The data preprocessing, such as data cleaning, may also be conducted in data preparation 410.

In regression analysis between KSMI and other parameters 420, every parameter's importance to the equipment safety may be analyzed and the controllable parameters with high importance may be identified. Also, a regression model between the important parameters and KSMI may be built, and such model may be considered relatively stable in the short future (e.g. several days).

In KSMI deviation analysis & prediction 430, the KSMI's expected values may be obtained for the historical records via a regression model, and the deviations between the expected value and actual value of KSMI may be calculated. The deviations may reflect the volatility caused by random factors. The normal distribution test for deviation data grouped by day may be conducted. The mean & stand deviation of deviation data grouped by day may be calculated and time series of mean & stand deviation may be obtained. In addition, the trend of mean & stand deviation series may be predicted.

In safety probability prediction 440, the primary value range for every reserved operation parameter may be set, and the primary parameter setting sets may be generated. For every primary setting set, the expected value of the KSMI may be calculated, and the operation margin of the predicted deviation according to expected value and warning threshold may be obtained, and based on that, the safety probability may be calculated.

In parameter setting recommendation 450, the setting sets conforming to the safety requirement may be selected. The safety range of parameters may be determined and if there are multiple KSMIs, then for each KSMI, the process may be repeated and the acceptable setting sets may be combined to determine the safety range as the final result.

Also, in model evaluation 460, the safety parameter range may be predicted for each day of historical records by the safety operation model. For each prediction, if the equipment works safely in reality, the real parameter set belongs to the predicted safety parameter range, or if the equipment works in danger in reality, and the real parameter set does not belong to the predicted safety parameter range, and then the prediction may be determined to be right.

Figure 5:
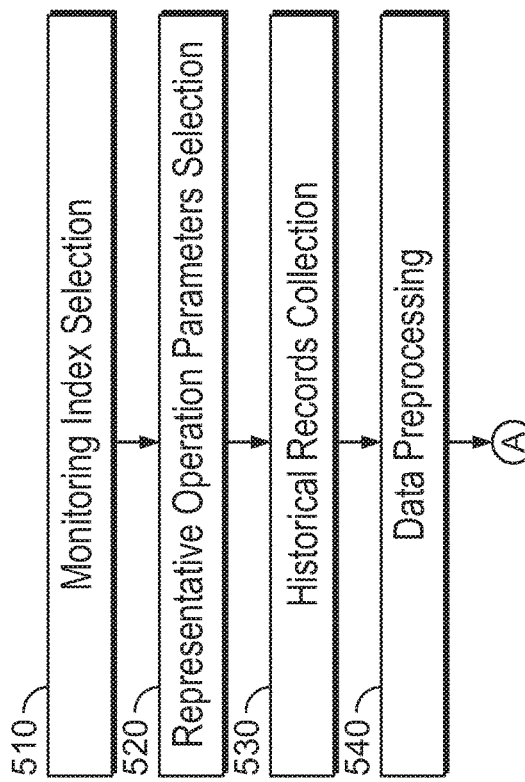
FIG. 5 illustrates an example of logic for data preparation.

FIG. 5 illustrates an example of logic for data preparation 500. As shown in FIG. 5, the data preparation may include monitoring index selection 510, representative operation parameters selection 520, historical records collection 530 and data preprocessing 540. In monitoring index selection 510, the key safety monitoring index may be chosen to reflect the state of safety. The key safety monitoring index may normally be given by the manufacturer. Equipment may be considered at risk when the index's value exceeds the warning threshold.

In representative operation parameters selection 520, operation parameters may be collected as much as possible for the later subsequent analysis. Operation parameters may include the controllable parameters of equipment itself and related process & other equipment. However some of those parameters may be correlated with each other or even co-linear. Those selected representative parameters may be independent to each other to reduce the dimension and computation complexity. The correlative analysis or clustering analysis among parameters may be performed. For those highly co-linear, only the easy to adapt one as a representative to ensure independence may be selected. If multiple parameters may be replaced by one parameter, only one representative may be chosen.

The historical records collection 530 may collect the historical records of the selected parameters and index. For example, 27 days' historical records may be provided, and the first 24 days' historical records may be used as training set to train the model, and the last 3 days' records may be used as the testing set. The data preprocessing 540 may be developed for preprocessing selected data for subsequent analysis such as data cleaning, normalization, etc.

The data preparation may be conducted for the AV45 shafting subsystem of the reaction-reproduction system in oil refining as shown in FIG. 3. For example, during the monitoring index selection, the axle vibration 320 may be monitored to evaluate the safety state for rotor equipment. The radial axle vibration 320 may be selected as the key safety monitoring index (KSMI). During representative parameters selection, parameters that may include those of MAB 310 itself, such as inlet pressure 340, outlet pressure 374, air volume 330, and those of other related equipment such as rotating speed 378, input voltage, current and power factor 376, and the bond phase 372 of gas turbine 360 may be selected. Inlet pressure 340 and outlet pressure 374 may be highly co-linear, and thus only inlet pressure 340 may be kept. Input voltage, current and power factor d376 may directly influence the rotating speed 378, thus, only the rotating speed 378 may be selected.

In the historical records collection, the records of the index and the selected parameters from database may be exported. Table 1 shows an example of the historical records of those selected parameters.

TABLE 1

Historical Records

| Bond Phase | Inlet Pressure | Air Volume | Rotating Speed | Axle Vibration |
|---|---|---|---|---|
| ... | ... | ... | ... | ... |
| 249985.7 | 9236.1 | 63977.1 | 250596.6 | 619.3 |
| 249985.6 | 9236.1 | 63977.1 | 250596.6 | 619.3 |
| ... | ... | ... | ... | ... |

Table 2 shows an example of the processed data after the data processing is conducted to historical records in Table 1. In Table 1, for each column, there may be 143 data points per day for each parameter when the parameter may be monitored for every 10 minutes. As such, in order to avoid large error in subsequent modeling caused by different magnitudes, all columns may be converted into the same magnitude level as shown in Table 2.

TABLE 2 processed historical records

| Bond Phase | Inlet Pressure | Air Volume | Rotating Speed | Axle Vibration |
|---|---|---|---|---|
| ... | ... | ... | ... | ... |
| 249.9 | 912.7 | 644.7 | 250.6 | 619.3 |
| 250.2 | 911.6 | 645.1 | 250.6 | 618.5 |
| ... | ... | ... | ... | ... |

Figure 6:
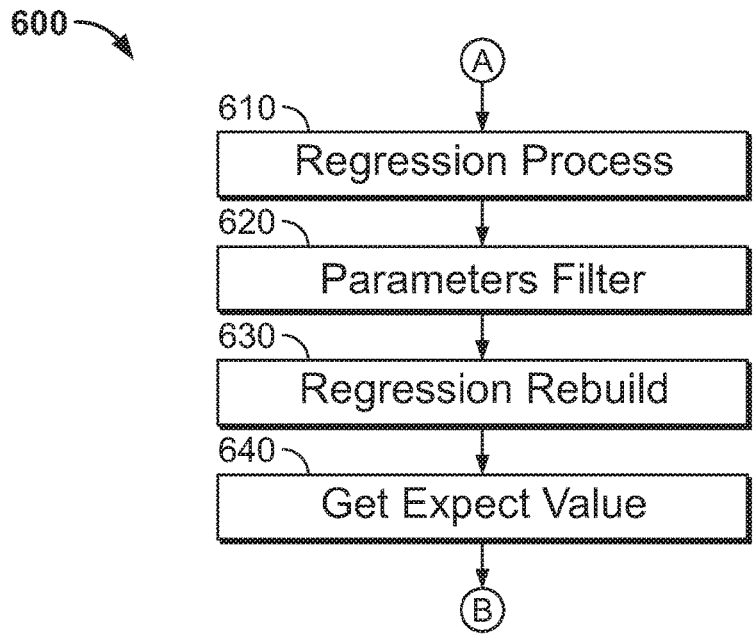
FIG. 6 illustrates an example of logic for a regression process.

FIG. 6 illustrates an example of logic for a regression process 600. The analytic model may be the accurate model to describe the formula of the KSMI and the selected parameters. The expected value of KSMI may be calculated via the analytic formula and the parameters' values. However, in practice, it may be difficult to build an analytic model for a complex nonlinear system. Thus, the data-driven method may be used to conduct fitting process on index and the preprocessed parameters to select the most important parameters for KSMI, and to build regression model to get the expected value of index in different operation conditions. As shown in FIG. 6, the regression model may include regression process 610, parameters filter 620, regression rebuild 630 and get expected value 640.

In the regression process 610, there may be big error for the nonlinear system when linear regression method is adopted. The random forest algorithm may be used in machine learning to conduct nonlinear fitting. Thus, the regression relationship between KSMI and parameters, and the importance of each parameter for the index may be obtained. As to the parameters filter 620, parameters with low importance may mean that these parameters may not have a big impact on the index. Those parameters may then be filtered out and only those with high importance above a user selectable threshold may be kept to lower the dimensions and simplify the model, moreover, to avoid interference brought by the unrelated parameters.

In regression rebuild 630, the nonlinear fitting may be conducted on reserved parameters and index to regenerate the regression model. If the mean square error (mse) of the new model is apparently bigger than that of the original model, then some removed parameters may be brought back again and the step above may be repeated until the new model's mse is not significantly bigger. In order to get the expected value 640, the parameters which may mainly influence the KSMI may be reserved and the regression model may be built. The model may be considered stable in the short future time. The expected value of KSMI may be obtained via the model and the values of the reserved parameters as illustrated in Formula 1.

$$y_{expect} = f(x_1, x_2 \ldots x_i)$$ Formula 1

In Formula 1, $y_{expect}$ is the expected value of KSMI, f means the regression model, $x_i$ is the $i_{th}$ reserved parameter.

As an example, the regression process may use the random forest algorithm to make nonlinear regression based on the data of the training set. For example, the mse of all trees may be 203.56. As to the parameters filter, every parameter's importance calculated by random forest may be listed in Table 2. As shown in Table 2, the inlet pressure and air volume have significant high importance. As such, the inlet pressure and air volume highlighted may be reserved and the rest may be removed.

TABLE 3

|  | % IncMSE | IncNodePurity |
|---|---|---|
| Bond Phase | 38.91 | 202367.9 |
| Inlet Pressure | 226.4 | 507309.0 |
| Air Volume | 238.2 | 505657.1 |
| Rotating Speed | 27.3 | 186647.1 |

After the inlet pressure and air volume are selected, the regression model may be rebuilt. The new model's mse after rebuilding the regression model may be 228.308. The new model's mse may not be significant bigger than that of original model. Thus, the filter may be considered reasonable. Finally, the expected value of axle vibration may be obtained via the trained random forest regression model once the air volume and inlet pressure may be set.

Figure 7:
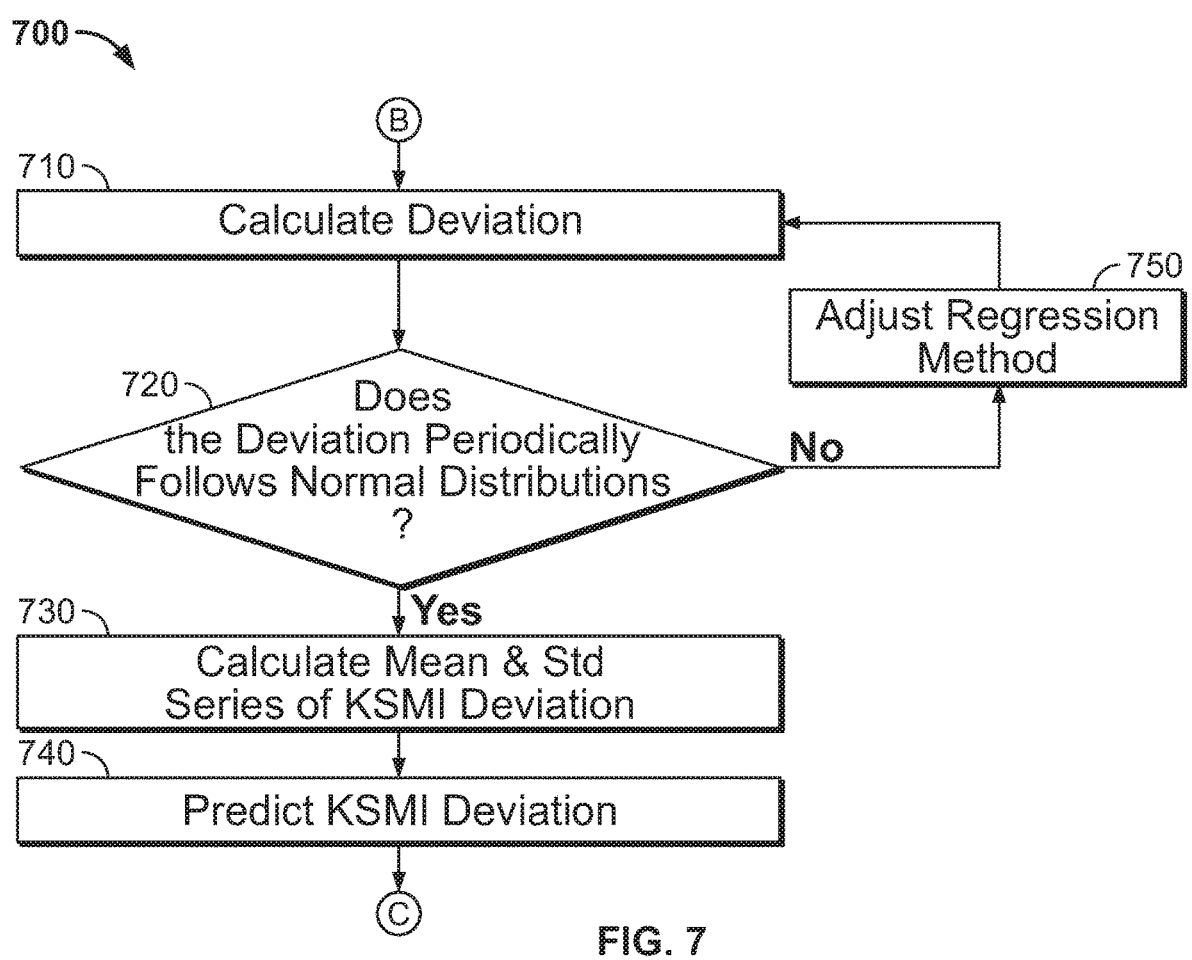
FIG. 7 illustrates an example of logic for KSMI deviation analysis and prediction.

FIG. 7 illustrates an example of logic for the KSMI deviation analysis and prediction 700. KSMI deviation may the difference between the expected value and the actual value of KSMI. In traditional analytic method, deviation, which may represents the change of the equipment itself such as aging and some random factors (noise), may be used to judge if the equipment is controllable and may be used to evaluate its health state. Thus, the trend of deviation distribution may be analyzed and predicted in the short time future so as to assist the estimation of the KSMI value by combining with the regression model obtained previously.

As shown in FIG. 7, the deviation may be calculated 710. For data points in the training set, deviation may be the residual error of the random forest regression model. While for those in the testing set, expected index value of every point may be calculated first via the model and parameters' value of that point, then deviation may be calculated by subtract expected part from actual index value as shown in Formula 2.

$$y_{residual} = y_{actual} - y_{expect}$$ Formula 2

In formula 2, $y_{residual}$ is the deviation between the expected value and actual value of KSMI, $y_{actual}$ is the actual value, $y_{expect}$ is the expected value.

The norm curve test 720 may be conducted. The norm curve test may check if every day's deviation data is normally distributed. If not, the regression method may be reselected or parameters of random forest algorithm may be adjusted until most of the days' data are normally distributed. After that, the mean and standard deviation (std) series of KSMI may be calculated 730. The deviation level may be described by using mean & std. Every day's mean and stand deviation may be calculated to generate mean & std series.

The KSMI deviation prediction may finally be conducted 740. Because mean & std series may not be stable, the unitary prediction method such as SVM, neural net algorithm, or ARIMA may not be accurate when predicting the trend. As such, a comprehensive method of Wavelet-ARIMA may be developed. According to Wavelet-ARIMA method, original series may be decomposed in multi levels and the signal reconstruction may be used to rebuild every frequency components into time domain as the series components. And then, ARIMA may be used to predict every series' component and sum the result as prediction for original series.

For example, the deviation calculation 710 may be conducted for data points in the training set (in the first 24 days of sample). The deviation may be the residual error of random forest. For deviation for the testing set (in the left 3 days of the sample), the deviation may be calculated as the difference of expected value and actual value of KSMI. The norm curve test 720 may be conducted by using QQ plot to check the deviation of each day of training set.

Figure 8:
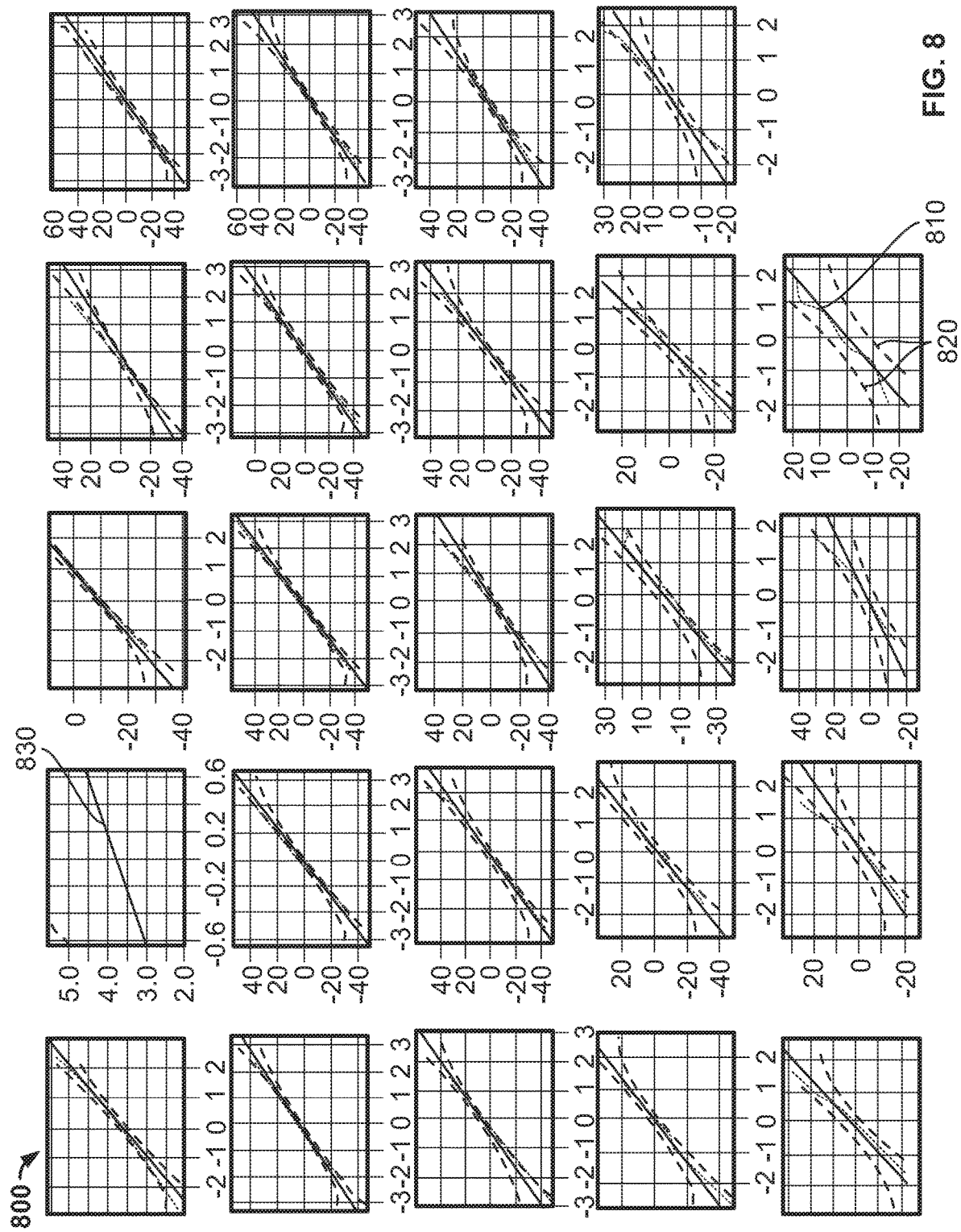
FIG. 8 shows an example of quantile-quantile (QQ) plot for the deviation of KSMI.

FIG. 8 shows an example of QQ plot for the deviation of KSMI 800. As shown in FIG. 8, it may be considered to be normally distributed if most points are near the solid line 810 and between two dotted lines 820. It may be told that the most day's data may be normally distributed expect the distribution for the 2$^{nd}$ day 830. So, if one day's mean & std of KSMI deviation are known, the deviation's distribution may be determined. As such, the mean & std deviation of every day's day may be calculated 730 by using first 24 day's data as the training set and the last 3 day's data as testing set.

Figure 9:
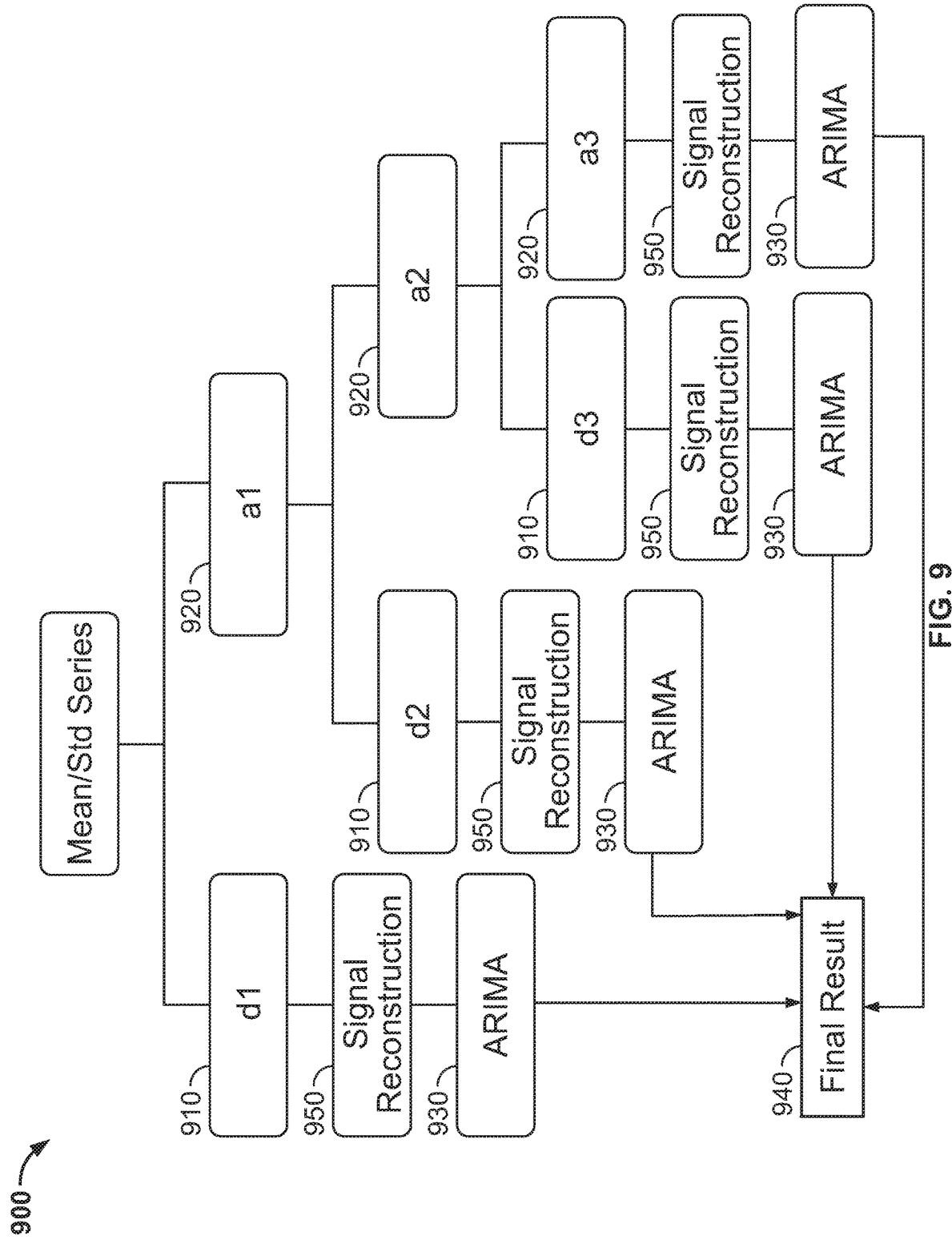
FIG. 9 shows an example of frequency components based analysis.
Figure 10:
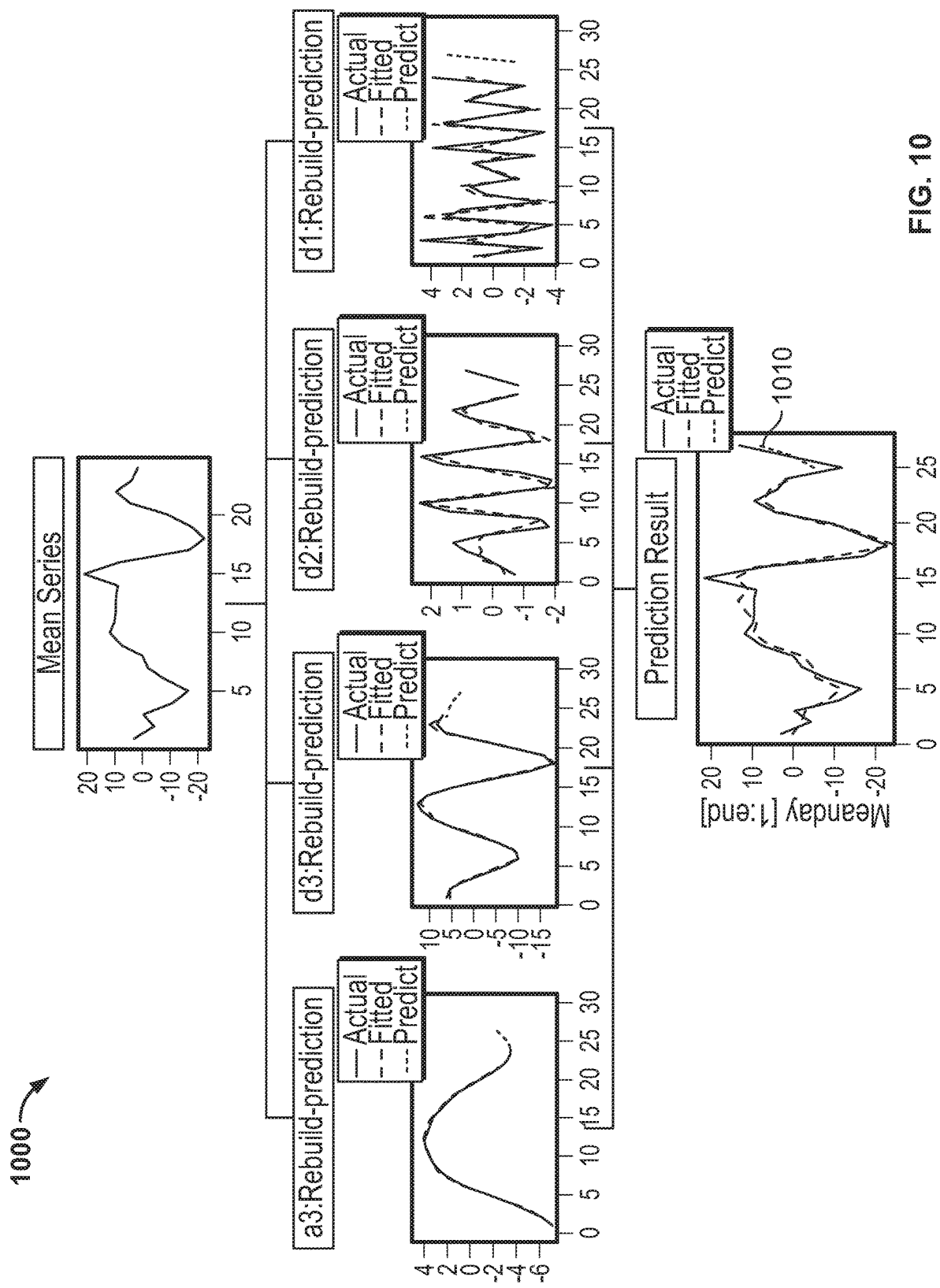
FIG. 10 illustrates the decomposition and prediction process for mean series.

FIG. 9 shows an example of frequency components based analysis 900. As shown in FIG. 9, decomposition level may be set to three (3), and thus, three (3) high frequency components 910 and one (1) low frequency components 920 may be obtained. However, different levels of decompositions such as three levels of low frequency components and one level of high frequency component, or three levels of high frequency components and three levels of low frequency components may also be obtained. The common type of wavelet includes Symlets, Morlet, Haar, Daubechies, etc. For example, db8 in Daubechies family may be chosen. As an example framework shown in FIG. 9, mean series with db8 wavelet by 3 levels may be decomposed, and the 3 high frequency 910 and 1 low frequency component 920 may be rebuilt into time domain as the series components via signal reconstruction 950, and ARIMA 930 may be used to predict each of the four series component. Finally the results of the series components may be summed as the final prediction result 940. FIG. 10 illustrates the decomposition and prediction process for mean series 1000. As shown in FIG. 10, the curve 1010 for predicted result matches the actual result very well. The std series may be conducted similarly by using the same process as mean series. The predicted result for the std series may also match the actual result very well.

Figure 11:
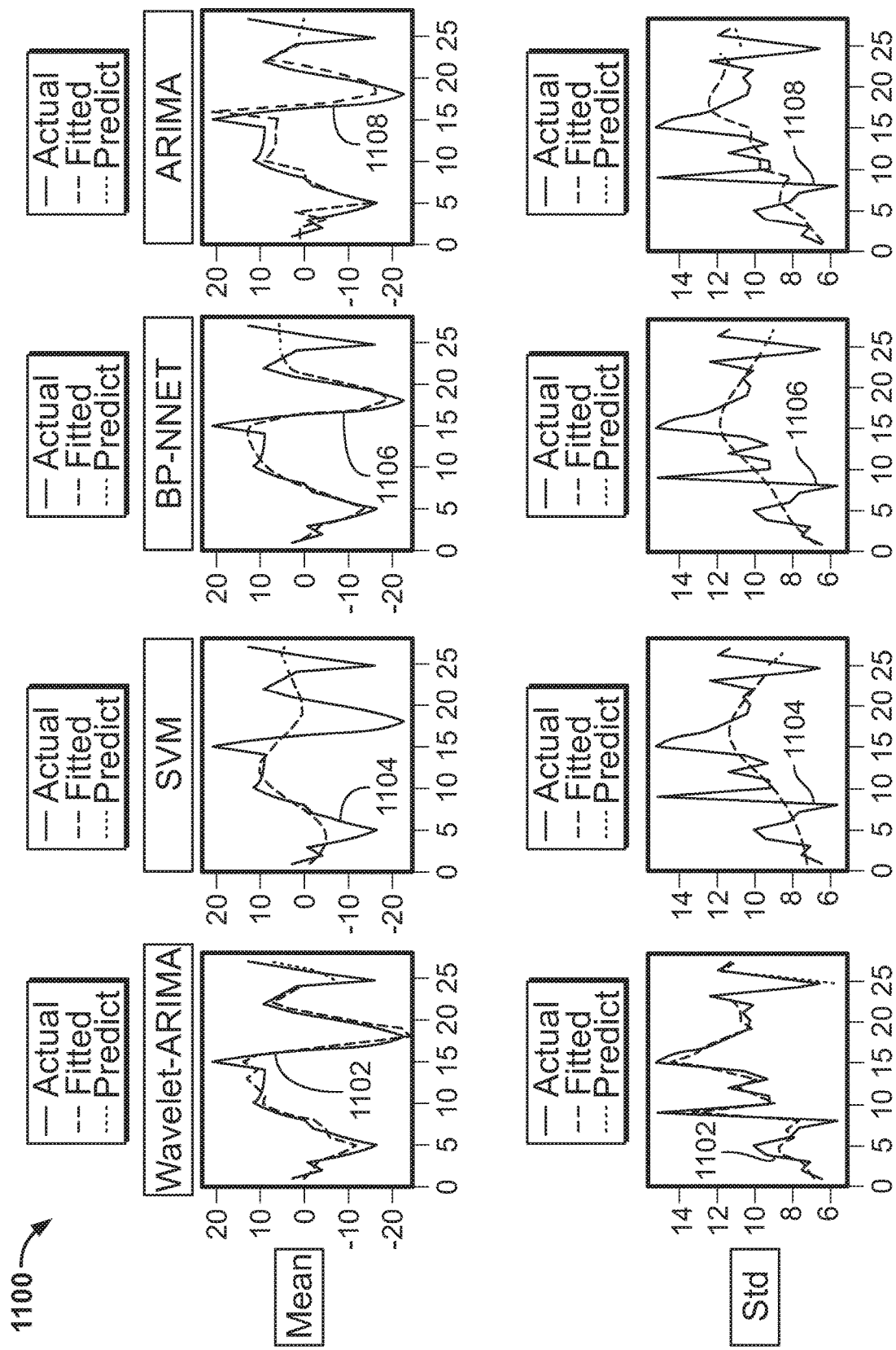
FIG. 11 shows a comparison of prediction result between Wavelet-ARIMA prediction model and the common unitary prediction models of Support Vector Machines (SVM), BP-NNET and Autoregressive integrated moving average (ARIMA).

FIG. 11 shows a comparison of prediction result between Wavelet-ARIMA prediction model and the common unitary prediction model such as SVM, BP-NNET and ARIMA 1100. As shown in FIG. 11, the prediction effect of Wavelet-ARIMA 1102 is significantly better that of SVM 1104, BP-NNET 1106 and ARIMA 1108. Wavelet-ARIMA may separate unstable original series into stable series components and thus improve the prediction accuracy.

Figure 12:
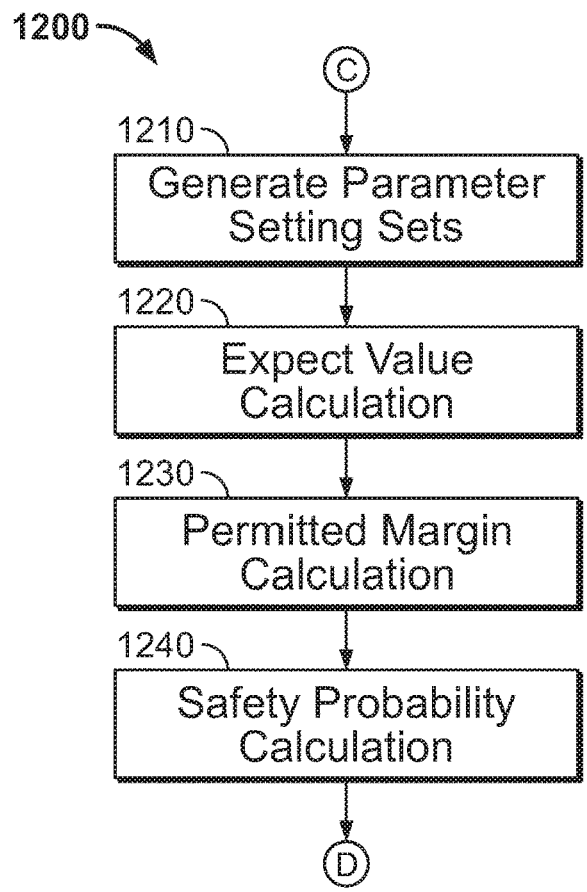
FIG. 12 illustrates an example of logic for calculating a safety probability.

FIG. 12 illustrates an example of logic for calculating a safety probability 1200. For the days in the short future, candidates of parameter setting sets may be generated, and corresponding expected value, permitted margin and safety probability may be calculated for every setting set based on the mean and std of deviation predicted. As shown in FIG. 12, parameter setting sets may be generated 1210. Parameters may not change severely in actual operation. For every reserved parameter, the value range as [min−3*std, max+3*std](min, max and std may be calculated by the historical records of every parameter) may be set or be primarily provided by the manufacturer. 100 isometric points within the value range may be chosen. And thus, if the number of the reserved parameters are n, then 100^n setting sets may be generated. In addition, value range and amount of setting points of each parameter may be adjusted according to operation requirements (if have), difficulty of adjustment and the limit of operational capability as shown in the following formula.

$$x_i \in [x_{imin}, x_{imax}]$$

$$x_{imin} = \min(x_{i\_his}) - 3*\text{std}(x_{i\_his})$$

$$x_{imax} = \max(x_{i\_his}) + 3*\text{std}(x_{i\_his})$$

In the above formula, $x_i$ is the $i_{th}$ parameters, $x_{i\_his}$ is the historical records set of $x_i$ The expected value calculation 1220 may be conducted. For every parameter setting set, the expected value of KSMI may be obtained via the trained random forest regression model. The expected value may depend on the selected parameter setting set as shown in the following formula.

$$y_{expect} = f(x_1, x_2, \ldots x_i)$$

In above Formula, $y_{expect}$ is the expected value of KSMI, f means the regression model, $x_i$ is the reserved parameter.

The permitted margin calculation 1230 may be conducted. The value of KSMI may consist of expect part and deviation part. For every parameter setting set, once the expected part is determined, the margin of deviation part may be calculated by the formula below:

$$y_{shift} = y_{lim} - y_{expect}$$

In this formula, $y_{expect}$ is the expected value of index, $y_{shift}$ is the permitted margin, $y_{lim}$ is the safety limit value of index.

As such, the safety probability may be obtained. Since the mean and std of deviation for the short term future may have been predicted and they may follow normal distribution, typical normal probability density function may be used to calculate the probability of which deviation part may not surpass its permitted margin for each of the 100^n parameter setting sets. The calculated probability may be regarded as the safety probability by using the formula below:

$$P(y < y_{lim}) = \int_{-\infty}^{Lim} \frac{1}{\sigma\sqrt{2\pi}} e^{-\frac{1}{2}\left(\frac{y-\mu}{\sigma}\right)^2} dy$$

As an example, parameter setting sets may be generated 1210 for reserved parameters including air volume and inlet pressure. For example, 10000 setting sets of the two parameters may be generated. Table 4 illustrates the generated parameter setting sets.

TABLE 4

| Air Volume | Inlet Pressure |
|---|---|
| 615.7251 | 876.2745 |
| ... | ... |
| 615.7251 | 896.1168 |
| ... | ... |

The expected value of axle vibration may be obtained via the trained random forest model for every setting set as illustrated in Table 5.

TABLE 5

| Air Volume | Inlet Pressure | Expected value |
|---|---|---|
| 615.7251 | 876.2745 | 664.0579 |
| ... | ... | ... |
| 615.7251 | 896.1168 | 663.209 |
| ... | ... | ... |

The permitted margin of the KSMI deviation may also be calculated for every setting set as illustrated in Table 6. In Table 6, the safety threshold of KSMI may be the maximum of the 24 days' vibration records plus 3 times of the standard deviation of the 24 days' vibration records when the equipment operated safely. In addition, in actual operation, the safety threshold may also be determined according to experience or rules or manufacturer manual. As such, the safety probability in the short future for every setting set may be calculated as illustrated in Table 7.

TABLE 6

| Air Volume | Inlet Pressure | Expected value | Permitted Margin |
|---|---|---|---|
| 615.7251 | 876.2745 | 664.0579 | 16.69495 |
| ... | ... | ... | ... |
| 615.7251 | 896.1168 | 663.209 | 17.54386 |
| ... | ... | ... | ... |

TABLE 7

| Air Volume | Inlet Pressure | Expected value | Permitted Margin | day 1 | day 2 | day 3 |
|---|---|---|---|---|---|---|
| 615.7251 | 876.2745 | 664.0579 | 16.69495 | 0.997366 | 0.922964 | 0.777415 |
| ... | ... | ... | ... | ... | ... | ... |
| 615.7251 | 896.1168 | 663.209 | 17.54386 | 0.998128 | 0.932919 | 0.799669 |
| ... | ... | ... | ... | ... | ... | ... |

Figure 13:
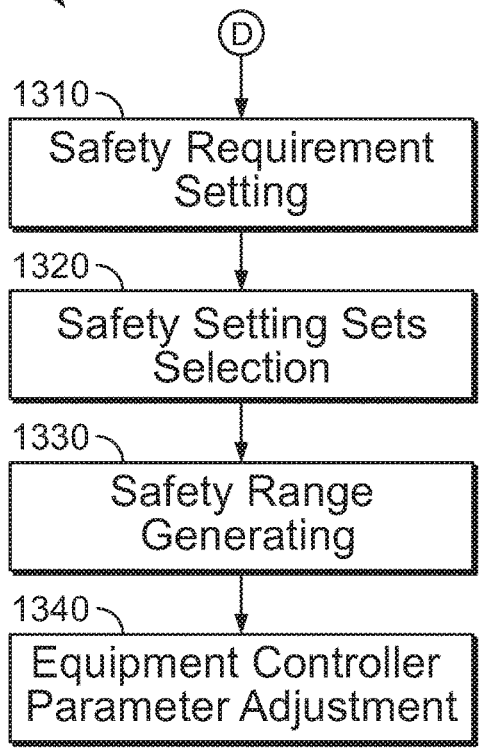
FIG. 13 illustrates an example of logic for selecting the safety operation range of the parameters.

FIG. 13 illustrates an example of logic for selecting the safety operation range of the parameters 1300. Since the safety probability for every setting set has been calculated, those setting sets which meet the safety requirement in the short time future may be chosen. Safety range for the parameters may also be obtained. As shown in FIG. 13, the logic for selecting the safety operation range of the parameters may include safety requirement setting 1310, safety setting sets selection 1320, safety range generating 1330 and equipment controller parameter adjustment 1340.

The safety requirement setting 1310 may be determined. The acceptable safety possibility of KSMI as safety requirement may be defined. Different kinds of machines or monitoring indices have different safety requirement, it shouldn't be too high or too low. 95% or 99% may be a good choice according to the importance of the equipment.

The setting sets may be selected 1320. Among all the setting sets, those that meet the safety requirement in the short time future may be selected. Because the settings may be discrete but usually it may be hard to control all the parameters at specific values, each setting point may be regarded as a continuous interval of each parameter between the setting and the previous setting.

The safety range generating 1330 may be conducted. The setting sets (the intervals) may be combined to get the final safety range. Safety range may provide permitted range of parameters which may help safety operation. If the number of the reserved parameters is small, safety range may be determined directly by merging the selected setting sets when selecting setting sets 1320. Otherwise, some parameters may be fixed in turn and setting sets of other parameters may be generated, and the step above may be repeated to determine the safety range of the rest parameters. In addition, when there may be multiple KSMIs, then the whole process for each KSMI may be repeated and their respective parameter safety settings may be integrated. Equipment controllable parameter may be adjusted 1340 after the safety operation range of the parameters are obtained.

The $3^{rd}$ day in the future (the 27th day) may be taken as an example. For the safety requirement, the safety requirement may be set to 0.95, which means the probability of axle vibration that exceeds its safe threshold shouldn't be greater than 0.05. After that, the parameter setting sets whose safety probability meets the requirement may be selected. Table 8 highlights the parameter setting sets that safety probability meets the requirement.

TABLE 8

| Air Volume | Inlet Pressure | Day 3 |
|---|---|---|
| ... | ... | ... |
| 615.7251 | 909.345 | 0.863956 |
| 615.7251 | 910.0799 | 0.939034 |
| 615.7251 | 910.8148 | 0.956504 |
| 615.7251 | 911.5497 | 0.973337 |
| 615.7251 | 912.2846 | 0.961142 |

TABLE 8-continued

| Air Volume | Inlet Pressure | Day 3 |
|---|---|---|
| 615.7251 | 913.0195 | 0.971861 |
| ... | ... | ... |

Figure 14:
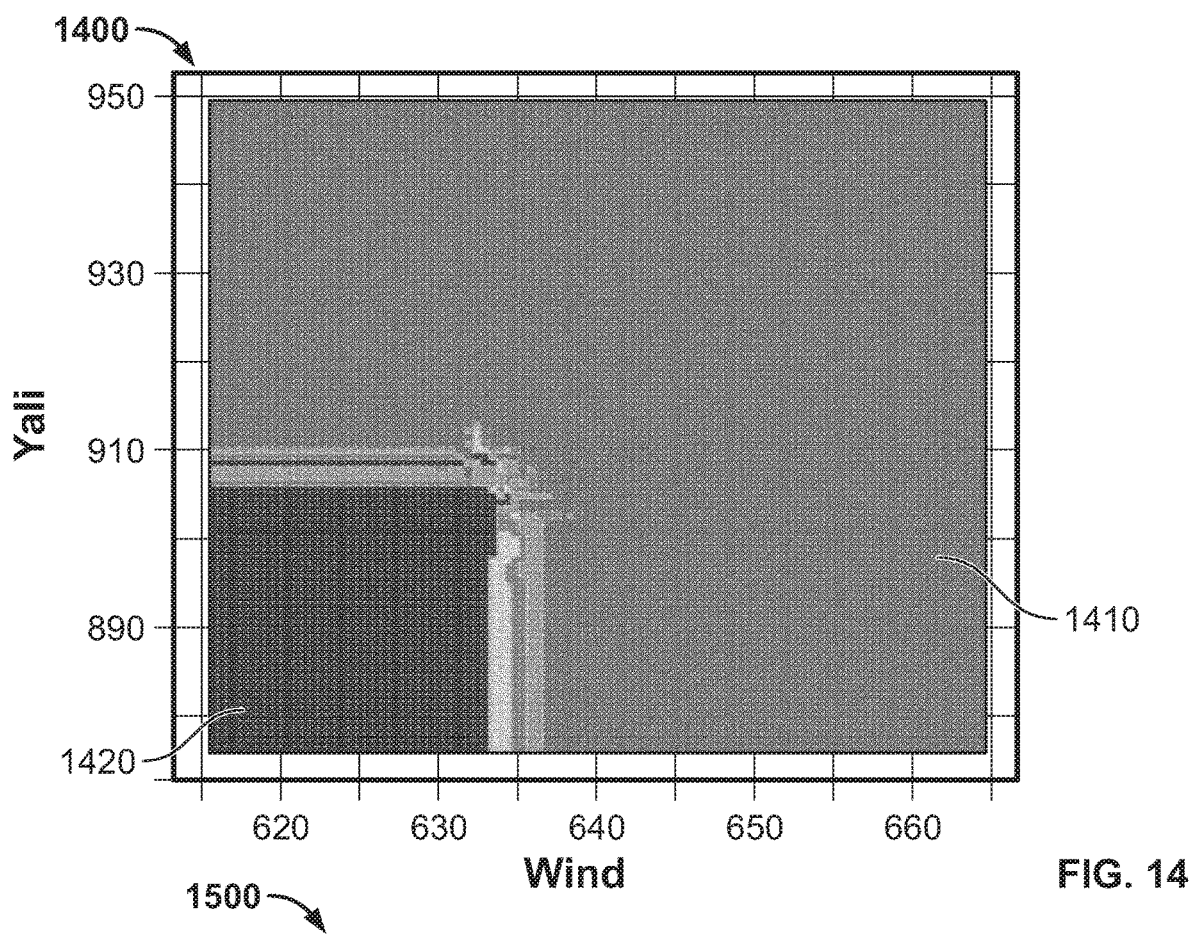
FIG. 14 illustrates the safety domain of air volume and inlet pressure.

FIG. 14 illustrates the safety range of air volume and inlet pressure 1400. As shown in FIG. 4, when the selected setting sets are merged, safety range of the air volume and inlet pressure 1410 may be obtained.

Figure 15:
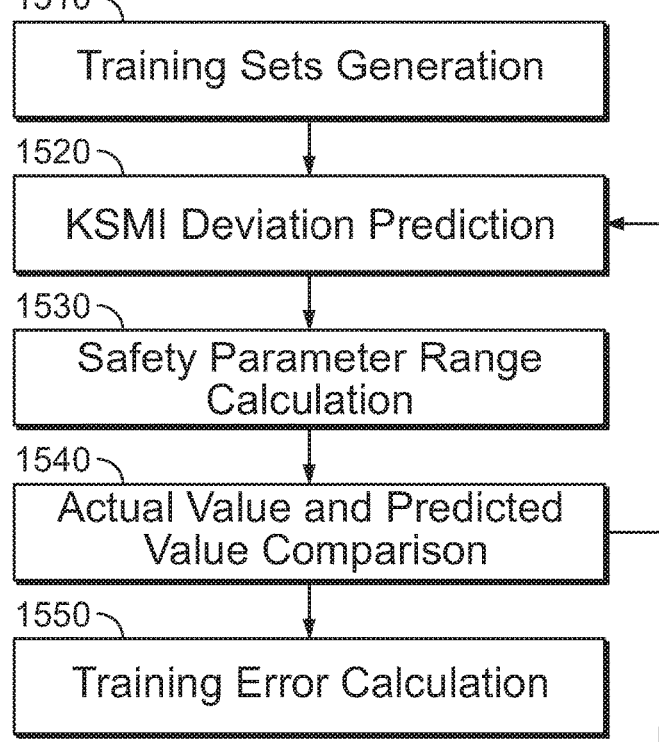
FIG. 15 illustrates an example of logic for evaluating the safety parameter ranges.

FIG. 15 illustrates an example of logic for evaluating the safety parameter ranges 1500. The training error may be the average loss over the training sample. The training error may be used to evaluate the performance of the method of short-term safety recommendation. When the training error is relatively low, the model may be assumed to be good. As shown in FIG. 15, the model evaluation may include training sets generation 1510, KSMI deviation prediction 1520, safety parameter range calculation 1530, actual value and predicted value comparison 1540 and training error calculation 1550.

A series of training sets and corresponding testing sets may be generated based on historical records. Observations of seven (7) continuous days may be used as a training set and the observations of next one day may be used as the testing set. This process may be repeated on all historical records to produce (n−7) training sets and corresponding testing sets (where n is the number of days in the original sample).

The mean and standard deviation of KSMI deviation may be predicted. For each training set and test set, comprehensive method of Wavelet-ARIMA may be used on the training set to simulate the trend of KSMI deviation, and then the mean and standard deviation of the KSIM deviation may be predicted on the test set.

The safety parameter range of the test set may be calculated. For the testing set, candidates of parameter setting sets may be generated and corresponding expected value, permitted margin and safety probability may be calculated for every setting set based on the mean and standard deviation of KSMI deviation predicted. The setting sets (the intervals) may be combined to get the final safety range. The safety range may provide permitted range of parameters which help safety operation.

The true value and predicted value may be compared. For the testing set, if the equipment works in safety in reality, and its actual parameter set is within the recommended safety parameter range, or if the equipment works in danger in reality and its actual parameter set doesn't belong to the predicted safety parameter range, then the prediction may be assumed to be right, otherwise, the prediction may be assumed to be wrong.

The training error may be calculated. The training error may be the average loss over all the testing sets. If the training error is relatively low, the model may be assumed to be good, otherwise, the model may need to be improved.

The example may be provided for one specific training and testing set. First, the mean and standard deviation of KSMI deviation may be predicted. Based on the observations of KSMI deviation during the $1^{st}$ day to $7^{th}$ day of historical record, the predicted mean and standard deviation of KSMI deviation on the $8^{th}$ day may be −9.2 and 9.4. Second, the safety parameter range of the test set may be calculated. For the $8^{th}$ day of historical record, the safety range of parameters 1410 may be obtained, and the danger range 1420 may also be obtained.

Finally, the true value and predicted value of the testing set may be compared. For all the 143 observations on the $8^{th}$ day, 95% of all the observations belong to the predicted safety parameter range, and the remaining 5% observations don't belong to the predicted safety parameter range. Since the equipment works safely in reality on $8^{th}$ day, the training error of the $8^{th}$ day is 5%.

Unlike current popular safety analysis method, the above disclosed method may not simply predict equipment failure possibility but to analyze the failure possibility under different parameter settings, and to recommend more suitable parameter setting range for better safety. This disclosed approach also uses Wavelets-ARIMA hybrid method for equipment safety analysis to improve the prediction accuracy.

FIG. 16 illustrates an example of a computer system that may be used for selecting controllable parameters for equipment operation safety 1600. Referring to FIG. 16, an illustrative embodiment of a computer system that may be used for one or more of the components illustrated by the method and system in FIGS. 1-2, or in any other system configured to carry out the methods discussed in this disclosure herein, is shown and is designated 1600. Although the computer system 1600 is illustrated in FIG. 16 as including all of the components as illustrated, it is within the scope of this innovation for the computing system to be comprised of fewer, or more, components than just illustrated in FIG. 16.

The computer system 1600 can include a set of instructions 1624 that can be executed to cause the computer system 1600 to perform any one or more of the methods, processes or computer-based functions disclosed herein. For example, the controllable parameters selection for equipment operation safety as described herein may be a program comprised of a set of instructions 1624 that are executed by the controller 1602 to perform any one or more of the methods, processes or computer-based functions described herein. Such a program may be stored in whole, or in any combination of parts, on one or more of the exemplary memory components illustrated in FIG. 16, such as the main memory 1604, static memory 1606, or disk drive 1616.

As described, the computer system 1600 may be mobile device. The computer system 1600 may also be connected using a network 1618, to other computer systems or peripheral devices. In a networked deployment, the computer system 1600 may operate in the capacity of a server or as a client user computer in a server-client user network environment, or as a peer computer system in a peer-to-peer (or distributed) network environment. In addition to embodiments in which the computer system 1600 is implemented, the computer system 1600 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 1600 can be implemented using electronic devices that provide voice, video or data communication. Further, while a single computer system 1600 is illustrated, the term "system" shall also be taken to include any collection of systems or sub-systems that individually or jointly execute a set, or multiple sets, of instructions to perform one or more computer functions.

As illustrated in FIG. 16, the computer system 1600 may include a controller 1102, such as a central processing unit ("CPU"), a graphics processing unit ("GPU"), or both. Moreover, the computer system 1600 can include a main memory 1604, and additionally may include a static memory 1606. In embodiments where more than one memory components are included in the computer system 1600, the memory components can communicate with each other via a bus 1608. As shown, the computer system 1600 may further include a display unit 1610, such as a liquid crystal display ("LCD"), an organic light emitting diode ("OLED"), a flat panel display, a solid state display, or a cathode ray tube ("CRT"). Additionally, the computer system 1600 may include one or more input devices 1612, such as a keyboard, push button(s), scroll wheel, digital camera for image capture and/or visual command recognition, touch screen, touchpad or audio input device (e.g., microphone). The computer system 1600 can also include signal outputting components such as a haptic feedback component 1614 and a signal generation device 1618 that may include a speaker or remote control.

Although not specifically illustrated, the computer system 1600 may additionally include a GPS (Global Positioning System) component for identifying a location of the computer system 1600.

Additionally, the computer system 1600 may include an orientation unit 1628 that includes any combination of one or more gyroscope(s) and accelerometer(s).

The computer system 1600 may also include a network interface device 1620 to allow the computer system 1600 to communicate via wireless, or wired, communication channels with other devices. The network interface device 1620 may be an interface for communicating with another computer system via a Wi-Fi connection, Bluetooth connection, Near Frequency Communication connection, telecommunications connection, internet connection, wired Ethernet connection, or the like. The computer system 1600 may also optionally include a disk drive unit 1616 for accepting a computer readable medium 1622. The computer readable medium 1622 may include a set of instructions that are executable by the controller 1602, and/or the computer readable medium 1622 may be utilized by the computer system 1600 as additional memory storage.

In a particular embodiment, as depicted in FIG. 16, the disk drive unit 1616 may include a computer-readable medium 1622 in which one or more sets of instructions 1624, such as software, can be embedded. Further, the instructions 1624 may embody one or more of the methods, processes, or logic as described herein. In a particular embodiment, the instructions 1624 may reside completely, or at least partially, within the main memory 1604, the static memory 1606, and/or within the controller 1602 during execution by the computer system 1600. The main memory 1604 and the controller 1602 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 1600 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 1622 that includes instructions 1624 or receives and executes instructions 1624 responsive to a propagated signal; so that a device connected to a network 1618 can communicate voice, video or data over the network 1618. Further, the instructions 1624 may be transmitted or received over the network 1618 via the network interface device 1620.

While the computer-readable medium 1624 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 1622 can include a solid-state memory such as a memory card or other package that houses one or more non-volatile read-only memories, such as flash memory. Further, the computer-readable medium 1622 can be a random access memory or other volatile re-writable memory. Additionally, the computer-readable medium 1622 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 1622 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by water and waste companies and broader resources and utilities institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. The inventive aspects will become apparent from the following detailed description when taken in conjunction with the accompanying drawings.

It should be noticed that, the steps illustrated in the flowchart of the drawings may be performed in a set of computer devices using executable program code. And the order of the steps may be different from that in the drawings under some status, although an example logic order is shown in the flowchart.

The purpose, technical proposal and advantages in the examples of the present disclosure will be clear and complete from the following detailed description when taken in conjunction with the appended drawings. The examples described thereinafter are merely a part of examples of the present disclosure, not all examples. Persons skilled in the art can obtain all other examples without creative works, based on these examples.

The numbers disclosed in tables in this disclosure are merely for illustrative purpose. The numbers may have units of measure that may be omitted from this disclosure. The illustrative numbers in tables may be used to illustrate the selection of the controllable parameters for equipment operation safety. The unit of measure for each number may or may not be relevant for selecting controllable parameters.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A system for selecting controllable parameters for equipment operation safety, comprising:
    a memory;
    a display;
    a communication interface;
    circuitry in communication with the memory, the communication interface and the display, the circuitry configured to:
    identify a key safety monitoring index (KSMI) for the equipment operation safety and collect historical records of the controllable parameters of equipment and process that are associated with the KSMI;
    select a first subset of the controllable parameters that have correlations to the KSMI above a user selectable threshold according to a first regression;
    select a second subset of the controllable parameters from the first subset of the controllable parameters to predict the KSMI by using a second regression, wherein the second subset has a number of the controllable parameters that is less than a number of controllable parameters in the first subset while maintaining a predetermined level of accuracy to predict the KSMI, and a residual error of the second regression is determined and a trend of the residual error is predicted by using a frequency based division;
    predict the equipment operation safety for a future time for a combination of values of the second subset of the controllable parameters;
    determine a safety range for each of the second subset of the controllable parameters wherein the equipment operation safety is achieved when the controllable parameters are inside the safety range; and
    transmit the controllable parameters to be set for the equipment operation safety according to the determined safety range.

2. The system of claim 1, wherein the KSMI reflects the equipment operation safety and is provided by a manufacturer.

3. The system of claim 1, wherein the first subset of the controllable parameters is selected based on importance of each parameter to the KSMI, and the user selectable threshold measures the importance.

4. The system of claim 1, wherein the first regression comprises a random forest algorithm.

5. The system of claim 1, wherein the residual error is determined by subtracting an expected value of the predicted KSMI from an actual KSMI derived from the collected historical records.

6. The system of claim 1, wherein the trend of the residual error is predicted by
decomposing original series into multiple levels according to the frequency based division and using a signal reconstruction to rebuild every frequency components into a time domain as series components;
predicting each of the series components and summing results as a prediction of the original series.

7. The system of claim 1, wherein the equipment operation safety for the future time is reflected by a safety probability that is calculated for each setting set of the second subset of the controllable parameters.

8. The system of claim 1, wherein the safety range is determined by selecting and merging the setting sets of the second subset of the controllable parameters when the safety probability meets a predetermined requirement.

9. The system of claim 1, wherein the circuitry is further configured to:
predict a plurality of sets of the controllable parameters for the KSMI, and evaluate each set of the controllable parameters by determining the predicted safety range for each set of the controllable parameters for KSMI.

10. The system of claim 1, wherein the circuitry is further configured to: adjust the controllable parameters for the KSMI to achieve the equipment operation safety according to the determined safety range.

11. A method for selecting controllable parameters for equipment operation safety, comprising:
identifying a key safety monitoring index (KSMI) for the equipment operation safety and collecting historical records of the controllable parameters of equipment and process that are associated with the KSMI;
selecting a first subset of the controllable parameters that have correlations to the KSMI above a user selectable threshold according to a first regression;
selecting a second subset of the controllable parameters from the first subset of the controllable parameters to predict the KSMI by using a second regression, wherein the second subset has a number of the controllable parameters that is less than a number of controllable parameters in the first subset while maintaining a predetermined level of accuracy to predict the KSMI, and a residual error of the second regression is determined and a trend of the residual error is predicted by using a frequency based division;
predicting the equipment operation safety for a future time for a combination of values of the second subset of the controllable parameters;
determining a safety range for each of the second subset of the controllable parameters wherein the equipment operation safety is achieved when the controllable parameters are inside the safety range; and
transmitting the controllable parameters to be set for the equipment operation safety according to the determined safety range.

12. The method of claim 11, wherein the KSMI reflects the equipment operation safety and is provided by a manufacturer.

13. The method of claim 11, wherein the first subset of the controllable parameters is selected based on importance of each parameter to the KSMI, and the user selectable threshold measures the importance.

14. The method of claim 11, wherein the first regression comprises a random forest algorithm.

15. The method of claim 11, wherein the residual error is determined by subtracting an expected value of the predicted KSMI from an actual KSMI derived from the collected historical records.

16. The method of claim 15, wherein the trend of the residual error is predicted by
decomposing original series into multiple levels according to the frequency based division and using a signal reconstruction to rebuild every frequency components into a time domain as series components;
predicting each of the series components and summing results as a prediction of the original series.

17. The method of claim 11, wherein the equipment operation safety for the future time is reflected by a safety probability that is calculated for each setting set of the second subset of the controllable parameters.

18. The method of claim 11, wherein the safety range is determined by selecting and merging the setting sets of the second subset of the controllable parameters when the safety probability meets a predetermined requirement.

19. The method of claim 11, further comprising:
predicting a plurality of sets of the controllable parameters for the KSMI, and evaluating each set of the controllable parameters by determining the predicted safety range for each set of the controllable parameters for KSMI.

20. The method of claim 11, further comprising: adjusting the controllable parameters for the KSMI to achieve the equipment operation safety according to the determined safety range.

21. A method for selecting controllable parameters for equipment operation safety, comprising:
identifying a key safety monitoring index (KSMI) for the equipment operation safety and collecting historical records of the controllable parameters of equipment that are associated with the KSMI wherein the KSMI reflects the equipment operation safety and is provided by a manufacturer;
selecting a first subset of the controllable parameters that have correlations to the KSMI above a user selectable threshold according to a first regression, wherein the first subset of the controllable parameters is selected based on importance of each controllable parameter to the KSMI, and the user selectable threshold measures the importance;
selecting a second subset of the controllable parameters from the first subset of the controllable parameters to predict the KSMI by using a second regression, wherein the second subset has a number of the controllable parameters that is less than a number of controllable parameters in the first subset while maintaining a predetermined level of accuracy to predict the KSMI, and a residual error of the second regression is determined by subtracting an expected value of the predicted KSMI from an actual KSMI derived from the collected historical records, and a trend of the residual error is predicted by decomposing original series into multiple levels according to the frequency based division and using a signal reconstruction to rebuild every frequency components into a time domain as series components, and predicting each of the series components and summing results as a prediction of the original series;

predicting the equipment operation safety for a future time for a combination of values of the second subset of the controllable parameters;

determining a safety range for each of the second subset of the controllable parameters wherein the equipment operation safety is achieved when the controllable parameters are inside the safety range, and wherein the equipment operation safety for the future time is reflected by a safety probability that is calculated for each setting set of the second subset of the controllable parameters, and the safety range is determined by selecting and merging the setting sets of the second subset of the controllable parameters when the safety probability meets a predetermined requirement; and transmitting the controllable parameters to be set for the equipment operation safety, and adjusting the controllable parameters for the KSMI to achieve the equipment operation safety according to the determined safety range.

* * * * *